(12) United States Patent
Lurie et al.

(10) Patent No.: US 8,204,191 B2
(45) Date of Patent: *Jun. 19, 2012

(54) APPARATUS AND METHOD FOR ENSURING A REAL-TIME CONNECTION BETWEEN USERS AND SELECTED SERVICE PROVIDER USING VOICE MAIL

(75) Inventors: Steven Lurie, San Francisco, CA (US); Scott Faber, San Francisco, CA (US); Sean Van der Linden, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/606,932

(22) Filed: Oct. 27, 2009

(65) Prior Publication Data

US 2010/0046724 A1 Feb. 25, 2010

Related U.S. Application Data

(63) Continuation of application No. 11/927,534, filed on Oct. 29, 2007, now Pat. No. 7,657,013, which is a continuation of application No. 10/611,050, filed on Jul. 1, 2003, now Pat. No. 7,289,612, which is a continuation of application No. 09/947,591, filed on Sep. 5, 2001, now Pat. No. 6,704,403.

(51) Int. Cl.
*H04M 15/00* (2006.01)
*H04M 3/42* (2006.01)

(52) U.S. Cl. ........... 379/114.1; 379/114.01; 379/114.21; 379/210.01

(58) Field of Classification Search ............. 379/114.01, 379/114.03, 114.05, 114.1, 114.13, 114.21, 379/114.23–114.28, 67.01, 88.06, 88.12, 379/88.17, 88.18, 80.01, 201.01, 209.01, 379/210.01, 214.01, 218.01, 265.01, 265.06, 379/265.09, 265.12; 705/5, 37, 52, 53; 707/6, 707/10

See application file for complete search history.

(56) References Cited

U.S. PATENT DOCUMENTS 4,751,669 A 6/1988 Sturgis et al.
(Continued)

FOREIGN PATENT DOCUMENTS

AU 699785 5/1995
(Continued)

OTHER PUBLICATIONS

USPTO Transaction History of related U.S. Appl. No. 09/414,710, filed Oct. 8, 1999, entitled "System for Providing Services in Real-Time Over the Internet."

(Continued)

*Primary Examiner* — Quoc D Tran
(74) *Attorney, Agent, or Firm* — Greenberg Traurig, LLP

(57) ABSTRACT

A method and apparatus are described for ensuring a real-time connection between users and selected service providers using voice mail. The system enables seekers of a wide array of services to select, contact, converse, and pay for a service provider using a communications device such as the telephone. A seeker locates a service provider by providing the name of a profession, which is recognized by the system's software. Once a service provider is selected, the system connects the seeker with the service provider for a live conversation. However, during service provider unavailability, the system enables the seeker to leave a voice mail message for the service provider and reconnects the user and service provider once the message is reviewed by the service provider. The system automatically bills the seeker for the time spent conversing with the service provider and compensates the service provider.

18 Claims, 14 Drawing Sheets

U.S. PATENT DOCUMENTS

| | | | |
|---|---|---|---|
| 5,058,152 A | 10/1991 | Solomon et al. | |
| 5,148,474 A | 9/1992 | Haralambopoulos et al. | |
| 5,155,761 A | 10/1992 | Hammond | |
| 5,325,424 A | 6/1994 | Grube | |
| 5,347,632 A | 9/1994 | Filepp et al. | |
| 5,359,508 A | 10/1994 | Rossides | |
| 5,459,779 A | 10/1995 | Backaus et al. | |
| 5,539,735 A | 7/1996 | Moskowitz | |
| 5,555,298 A | 9/1996 | Jonsson | |
| 5,602,905 A | 2/1997 | Mettke | |
| 5,619,991 A | 4/1997 | Sloane | |
| 5,634,012 A | 5/1997 | Stefik et al. | |
| 5,638,432 A | 6/1997 | Wille et al. | |
| 5,694,549 A | 12/1997 | Carlin et al. | |
| 5,710,887 A | 1/1998 | Chelliah et al. | |
| 5,712,979 A | 1/1998 | Graber et al. | |
| 5,715,314 A | 2/1998 | Payne et al. | |
| 5,717,860 A | 2/1998 | Graber et al. | |
| 5,718,247 A | 2/1998 | Frankel | |
| 5,721,763 A | 2/1998 | Joseph et al. | |
| 5,722,418 A | 3/1998 | Bro | |
| 5,724,424 A | 3/1998 | Gifford | |
| 5,778,367 A | 7/1998 | Wesinger, Jr. et al. | |
| 5,794,221 A | 8/1998 | Egendorf | |
| 5,809,119 A | 9/1998 | Tonomura et al. | |
| 5,818,836 A | 10/1998 | DuVal | |
| 5,819,092 A | 10/1998 | Ferguson et al. | |
| 5,819,267 A | 10/1998 | Uyama | |
| 5,819,271 A | 10/1998 | Mahoney et al. | |
| 5,825,869 A | 10/1998 | Brooks et al. | |
| 5,825,876 A | 10/1998 | Peterson, Jr. | |
| 5,850,433 A | 12/1998 | Rondeau | |
| 5,862,223 A | 1/1999 | Walker et al. | |
| 5,864,871 A | 1/1999 | Kitain et al. | |
| 5,870,744 A | 2/1999 | Sprague | |
| 5,884,032 A | 3/1999 | Bateman et al. | |
| 5,884,272 A | 3/1999 | Walker et al. | |
| 5,884,282 A | 3/1999 | Robinson | |
| 5,893,077 A | 4/1999 | Griffin | |
| 5,911,132 A | 6/1999 | Sloane | |
| 5,914,951 A | 6/1999 | Bentley et al. | |
| 5,940,471 A | 8/1999 | Homayoun | |
| 5,960,069 A | 9/1999 | Felger | |
| 5,982,863 A | 11/1999 | Smiley et al. | |
| 5,991,394 A | 11/1999 | Dezonno et al. | |
| 6,014,439 A | 1/2000 | Walker et al. | |
| 6,026,148 A | 2/2000 | Dworkin et al. | |
| 6,029,141 A | 2/2000 | Bezos et al. | |
| 6,046,762 A | 4/2000 | Sonesh et al. | |
| 6,064,978 A | 5/2000 | Gardner et al. | |
| 6,185,289 B1 | 2/2001 | Hetz et al. | |
| 6,223,165 B1 | 4/2001 | Lauffer | |
| 6,230,287 B1 | 5/2001 | Pinard et al. | |
| 6,353,663 B1 | 3/2002 | Stevens et al. | |
| 6,470,338 B1 | 10/2002 | Rizzo et al. | |
| 6,513,013 B1 | 1/2003 | Stephanou | |
| 6,523,101 B1 | 2/2003 | Lauffer | |
| 6,546,372 B2 | 4/2003 | Lauffer | |
| 6,549,889 B2 | 4/2003 | Lauffer | |
| 6,704,403 B2 | 3/2004 | Lurie et al. | |
| 6,801,899 B2 | 10/2004 | Lauffer | |
| 7,249,045 B2 | 7/2007 | Lauffer | |
| 7,289,612 B2 | 10/2007 | Lurie et al. | |
| 7,657,013 B2 * | 2/2010 | Lurie et al. | 379/114.1 |
| 2002/0010608 A1 | 1/2002 | Faber et al. | |
| 2008/0049917 A1 | 2/2008 | Lurie et al. | |
| 2009/0006174 A1 | 1/2009 | Lauffer | |
| 2010/0208028 A1 | 8/2010 | Lauffer | |

FOREIGN PATENT DOCUMENTS

| | | |
|---|---|---|
| GB | 2329046 | 3/1999 |
| JP | 09233441 | 9/1997 |
| JP | 09319812 | 12/1997 |
| WO | 9804061 | 1/1998 |
| WO | 0057326 | 9/2000 |
| WO | 0127825 | 4/2001 |

OTHER PUBLICATIONS

USPTO Transaction History of related U.S. Appl. No. 09/488,130, filed Jan. 20, 2000, entitled "Method Apparatus to Connect Consumer to Expert," now U.S. Patent Serial No. 6,223,165.

USPTO Transaction History of related U.S. Appl. No. 09/733,872, filed Dec. 8, 2000, entitled "Assistance Method and Apparatus," now U.S. Patent Serial No. 6,523,010.

USPTO Transaction History of related U.S. Appl. No. 09/782,925, filed Feb. 13, 2001, entitled "Assistance Method and Apparatus," now U.S. Patent Serial No. 6,549,889.

USPTO Transaction History of related U.S. Appl. No. 09/782,984, filed Feb. 13, 2001, entitled "Assistance Method and Apparatus," now U.S. Patent Serial No. 6,546,372.

USPTO Transaction History of related U.S. Appl. No. 09/947,591, filed Sep. 5, 2001, entitled "Apparatus and Method for Ensuring a Real-Time Connection Between Users and Selected Service Provider Using Voice Mail," now U.S. Patent Serial No. 6,704,403.

USPTO Transaction History of related U.S. Appl. No. 10/107,743, filed Mar. 26, 2002, entitled "Assistance Method and Apparatus," now U.S. Patent Serial No. 6,801,899.

USPTO Transaction History of related U.S. Appl. No. 10/611,050, filed Jul. 1, 2003, entitled "Apparatus and Method for Ensuring a Real-Time Connection Between Users and Selected Service Provider Using Voice Mail," now U.S. Patent Serial No. 7,289,612.

USPTO Transaction History of related U.S. Appl. No. 10/951,502, filed Sep. 27, 2004, entitled "Method and System to Connect Consumers to Information," now U.S. Patent Serial No. 7,249,045.

USPTO Transaction History of related U.S. Appl. No. 11/772,525, filed Jul. 2, 2007, entitled "Method and System to Connect Consumers to Information."

USPTO Transaction History of related U.S. Appl. No. 11/927,534, filed Oct. 29, 2007, entitled "Apparatus and Method for Ensuring a Real-Time Connection Between Users and Selected Service Provider Using Voice Mail."

Kabeya, Kiyoshi et al., "A New Teleconsultation Terminal System Using ISDN," NTT Review, vol. 3, No. 4, pp. 37-43, Jul. 1991.

Griffiths, J.W.R. et al., "Multimedia Communication in a Medical Environment," Singapore International Conference on Networks, pp. 166-171, Sep. 5, 1991.

Herzberg, Amir et al., "MiniPay: Charging Per Click on the Web," Computer Networks and ISDN Systems, vol. 29, pp. 939-951, Sep. 1997.

Wagner, Mary, "Caring for Customers: Real-Time Text Chat and Telephony Provide Personalized Customer Support and Turn Queries into Sales Leads," Internet World Media, vol. 5, iss. 28, p. 30, Sep. 1, 1999.

"Applying Technology News," Accounting Technology, p. 14, Feb./Mar. 1997.

Greenblatt, Ellen, "Have You Ever Wondered . . . ," Datamation, p. 126, Oct. 1997.

Hodgson, Cynthia, "Online Expert Databases & Services," Econtent, pp. 48-53, Dec. 1999.

Kanellos, Michael, "Web Watch: Do You Want to Know the Meaning of Life?," Computer Reseller News, pp. 72-74, Mar. 3, 1997.

Addeo, E.J. et al., "An Experimental Multi-Media Bridging System," Frontiers in Computer Communications Technology, Computer Communications Review, vol. 17, No. 5, pp. 236-242, Aug. 11-13, 1987.

Asthana, Abhaya et al., "A Small Domain Communications System for Personalized Shopping Assistance," IEEE International Conference on Personal Wireless Communications, Publication No. 0-7803-1996-6/94, pp. 199-203, Aug. 18, 1994.

Becker, Ralph, "ISDN Tutorial: Definitions," retrieved from http://www.ralphb.net/ISDN/defs.html, available at least by Apr. 21, 2000.

Hase, Masahiko et al., "Advanced Videophone System Using Synchronized Video Filing Equipment," NTT Review, vol. 3, No. 4, pp. 29-36, Jul. 1991.

Littleton, Linda, "HDD: A Helpdesk Database," Proceedings of the ACM SIGUCCS User Services Conference XXII, pp. 205-210, Oct. 16-19, 1994.

Ludwig, L.F. et al., "Laboratory for Emulation and Study of Integrated and Coordinated Media Communication," Conference on Office Information Systems, pp. 283-291, Mar. 23-25, 1988.

Mercalli, Franco et al., "The ESSAI Teleshopping System: An Example of a Broadband Multimedia Application," IEEE Global Telecommunications Conference, pp. 572-576, Nov. 28, 1994.

ALLEXPERTS.COM, company information retrieved from http://www.allexperts.com, available at least by Apr. 9, 2000.

Angelo, Simon, "SurfBrains.com: Brains Online Save Time & Money," M2 Presswire, Jul. 11, 2000.

ANSWERS.COM, company information retrieved from http://www.answers.com, available at least by Aug. 8, 2000.

EK, Brian, "Walker Digital Issued Landmark U.S. Patent No. 5,862,223 for Global Internet Marketplace for Experts", Business Wire, Jan. 26, 1999.

EXP.COM, Inc., company information retrieved from http://www.exp.com, available at least by Sep. 20, 2000.

Experts Exchange, Inc., company information retrieved from http://www.experts-exchange.com, available at least by Apr. 9, 2000.

Information Markets Corp., company information retrieved from http://www.infomarkets.com, available at least by Aug. 8, 2000.

INTELLECTEXCHANGE.COM, Inc., company information retrieved from http://www.intellectexchange.com, available at least by Aug. 8, 2000.

Ott, Chris, "Making Good on the Information Economy," Denver Business Journal, vol. 51, No. 17, p. 27A, Dec. 17, 1999.

QCIRCUIT.COM, company information retrieved from http://www.qcircuit.com, available at least by Aug. 8, 2000.

Rogers, Michael et al, "Experts Abound at New Web Sites," Library Journal, pp. 22-24, Mar. 1, 2000.

University of Texas—Austin, information on the Electronic Emissary Project retrieved at www.tapr.org/emissary, available at least by Apr. 9, 2000.

Wasik, Joann M., "Information for Sale: Commercial Digital Reference and AskA Services," Virtual Reference Desk, http://www.vrd.org/AskA/commAskA.html, Sep. 20, 1999.

"Connecting to On-Line Car Shoppers: Auto Sellers Use Netcall Internet Call-Button Technology to Turn 'Clicks' into Interactive Sales," Business Wire, p. 4089, Jul. 19, 1999.

"NetCall Internet Call Buttons Enhance E-Commerce Customer Service and Sales," PR Newswire, p. 7431, Aug. 9, 1999.

"TriNet's 'Help Me, I'm Stuck' Internet Voice Button Services Pushes Web Pages to Online Users," Business Wire, Mar. 25, 1998.

Broad, Doug et al., "Lucent Technology and Netscape Team to Deliver Lucent Ecommerce Solutions," Business Wire, Sep. 23, 1998.

Collett, Stacey et al., "Why Online Browsers Don't Become Buyers," Computerworld, vol. 33, No. 48, p. 14, Nov. 29, 1999.

Dalton, Gregory, "Rent-An-Expert on the Web," Information Week, p. 75, Sep. 6, 1999.

Davey, Tom, "Wheeling and Dealing Online," PC Week, vol. 13, No. 45, pp. 1, 129, Nov. 11, 1996.

EXPERTCITY.COM, "About Us," company information retrieved from http://www.expertcity.com, available at least by Apr. 9, 2000.

Healey, John, "From A-Z: You Can Sell Advice Online," San Jose Mercury News, retrieved from http://www.mercurycenter.com on Oct. 24, 2001.

KEEN.COM, company information retrieved from http://www.keen.com, available at least by 1999.

Menn, Joseph, "An Expert? There's Now a Home for You on the Internet," Los Angeles Times, retrieved from http://www.denverpost.com on Oct. 24, 2001.

Moore, Michael et al., "USA Global Link Brings Interactively to Internet Shopping," Business Wire, Oct. 7, 1998.

Pelline, Jeff, "Net Firm to Connect Users by Phone," CNET News.com, Nov. 8, 1999.

Tehrani, Rich, "e-Rip Van Winkle and the 60-second Nap," Call Center Solutions, vol. 18, No. 2, pp. 16-18, Aug. 1999.

Wieland, Heidi et al., "Expertcity.com Launches Premier Online Marketplace for Expert Services," PR Newswire, Aug. 30, 1999.

KEEN.COM, "Keen.Com Launches First Live Answer Community, Connects People with Information to Share Over Their Standard Telephone," company press release, Nov. 8, 1999.

"Keen.com raises $60 Million from Prestigious Investors and Strategic Partners Just 60 Days After Launch of Its Live Answer Community," Business Wire, Jan. 11, 2000.

International Application No. PCT/US00/06849, International Search Report, May 16, 2000.

International Application No. PCT/US00/10730, International Search Report, Jan. 3, 2001.

* cited by examiner

500

KEEN™.com
Your Live Answer Community ™

You Are Not Available   Notify me of incoming calls   [* Sign Out]

| Home | My Account | Keen Mall | My Listings | Help |

View My Listings | Create a Listing | My Homepage | My Customers | Speaker Tips

Your Listing Category

In which category would you like your new listing to appear?

Age Groups (1131)
Arts & Entertainment (911)
Auctions (352)
Autos & Vehicles (276)
Business & Personal Finance (1397)
Career & Education (791)
Computing & Internet (791)
Cultural & Religion (536)
Family & Parenting (729)
Food & Cooking (357)
Games (325)

Health & Fitness (976)
Hobbies & Collectibles (511)
Home & Garden (387)
Local Interests (319)
Personal Advice (3928)
Pets (430)
Romance & Social (3374)
Shopping (174)
Sports & Recreation (468)
Travel (574)
Women's Issues (465)

Suggest a new topic

Home | My Account | Keen Mall | My Listings | Help

KEEN™.com
Your Live Answer Community ™

Home ▫ Get Advice ▫ My Keen ▫ Give Advice ▫ Help

All Categories > Health & Therapy > Diet & Nutrition  Give Advice on this Topic

[Search]  Find a Keen Member  ☐ This category only

Top Rated     New Listings     Recorded Advice     Next >

| Availability | Name | | Title | Rating | Rate* | |
|---|---|---|---|---|---|---|
| Call Now | DocTalk Is In | 📷✓ | Weight Loss & Nutrition Information from DocTalk | 15 | $3.49 | FREE MINUTES |
| Call Now | WMX | 📷 | Tips and Basics for dieting(mass or definition) | New | $1.75 | FREE MINUTES |
| Call Now | 770 | | Vegetarian Questions? | New | $0.85 | FREE MINUTES |
| Call Now | 4therapyTest | | Help with nutrition test | New | $0.50 | FREE MINUTES |
| Call Now | HolisticHelp | 📷 | It's Not Your Fault Your Overweight | New | $1.50 | FREE MINUTES |
| Call Now | MissDebi | 📷 | Visualization for Permanent Weightloss | New | $1.70 | FREE MINUTES |
| Call Now | AndreaMSRD | 📷 | Healthy Eating Tips | New | $1.99 | FREE MINUTES |
| Call Now | Margie RD NSCA-CPT | 📷 | Registered Dietitian - Nutrition & Fitness Expert | New | $1.99 | FREE MINUTES |
| Call Now | Lauren MS RD | 📷 | Get Expert Advice from a Registered Dietitian Now! | New | $1.99 | FREE MINUTES |
| Call Now | Robert Ross | 📷 | Natural Health & Weight Loss with Raw Living Foods | 0 | $1.00 | FREE MINUTES |
| Call Now | jbvo | | How to burn fat and without dieting | 0 | $0.75 | FREE MINUTES |
| Call Now | andrew2416 | | Personal Health & Dietary Profiling | 0 | $2.50 | FREE MINUTES |
| Call Now | FONEMED Family Nurse | 📷✓ | Weight Loss Information & Support from an RN | -1 | $2.32 | FREE MINUTES |
| Call Now | marz63 | | Your Personal Trainer | -2 | $1.85 | FREE MINUTES |
| Call Now | axelf | | guaranteed weight loss for obese people | -2 | $5.99 | FREE MINUTES |
| Call Now | jiffy41 | | Teens with weight problems | -6 | $0.50 | FREE MINUTES |
| Mail Now | Cathy Marie | 📷 | I have lost 250 lbs! LET ME HELP YOU! | 13 | $2.40 | FREE MINUTES |

USER INTERFACE SCREEN 600

FIG. 5

USER MESSAGE SCREEN 630

FIG. 6

APPARATUS AND METHOD FOR ENSURING A REAL-TIME CONNECTION BETWEEN USERS AND SELECTED SERVICE PROVIDER USING VOICE MAIL

CLAIM OF PRIORITY

This application is a continuation application of U.S. patent application Ser. No. 11/927,534, filed on Oct. 29, 2007, which is a continuation application of U.S. patent application Ser. No. 10/611,050, filed on Jul. 1, 2003 and now U.S. Pat. No. 7,289,612, which is a continuation application of U.S. patent application Ser. No. 09/947,591, filed on Sep. 5, 2001, now U.S. Pat. No. 6,704,403.

FIELD OF THE INVENTION

The invention relates generally to providing users with service providers in a field of service desired by the user. In particular, the invention relates to a method and apparatus for ensuring a real-time connection between users and selected service provider using voice mail.

BACKGROUND OF THE INVENTION

Consumers interested in acquiring services must first identify a service provider who is capable of providing the required services. At present, this usually means perusing a telephone directory, which can become frustrating and time-consuming if the service providers telephoned are not immediately available. In addition, a simple telephone call does not enable the service provider to charge a fee according to the time spent with his/her customers.

Systems now exist that enable providers of services to charge fees for the time spent delivering the service. 1-900 phone numbers will charge the seeker of services according to the time spent receiving the service and will transfer this payment, or a portion of it, to the provider.

Each 1-900 number, however, has a very narrow scope—"Hear your Horoscope," for instance. If a seeker would like to hear an entirely different service—"Your Local Weather," for instance—he/she would have to dial a completely different 1-900 number. Similarly, each 1-900 number is quite rigid in the price, quality, and specificity of its service.

However, current systems now exist that enable seekers to locate service providers according to a wide range of price, quality and specificity of service (U.S. application Ser. No. 09/414,710). Such systems also make is possible for the service provider and buyer to be connected and communicate in real time. Unfortunately, a real-time communications connection is not always established between service seekers and service providers. Service provider unavailability is a primary cause for failure to establish the real-time communication link with the user.

Therefore, there remains a need to overcome one or more of the limitations in the above described existing art which are satisfied by the inventive structure and method described hereinafter.

SUMMARY OF THE INVENTION

The present invention overcomes the problems in the existing art described above by providing a method and apparatus for ensuring a real-time connection between users and selected service provider using voice mail. The present invention is a system through which seekers of a wide array of services can select, contact, converse, and pay for a service provider using a real-time communications device such as the telephone. The invention enables the service seeker to locate a service provider by communicating the name of a profession, such as "psychiatrist," which is recognized by the system's software. In a similar fashion, the seeker can then specify a price range, quality rating, language, and keyword descriptors of the service provider. Within the desired parameters, the system offers service providers who have made themselves available to render services at the present time.

Once the appropriate available service provider is selected, the system automatically connects the service seeker with the service provider for a live conversation. However, in the event of service provider unavailability, the system enables a service seeker to leave a voice mail message for the selected service provider. Consequently, the system can facilitate a real-time communications link between the service seeker and service provider in response to review of the voice mail by the service provider. The system automatically bills the service seeker for the time spent conversing with the service provider and compensates the service provider accordingly.

Advantages of the invention include providing users with the capability to engage in a live conversation with a selected service provider via a telephone. Contrary to prior systems, requiring an internet connection and browser to receive such services, the equivalent is now provided by a simple voice transmission medium such as the telephone. As a result, virtually anyone can benefit from the capabilities provided by the present invention. The system also allows providers of a field of service to be compensated for supplying their expertise to a user. In addition, the system facilitates a real-time communications connection between a service seeker and a selected service provider once the service provider becomes available following an initial unavailability.

BRIEF DESCRIPTION OF THE DRAWINGS

The present invention is illustrated by way of example, and not by way of limitation, in the figures of the accompanying drawings and in which:

FIG. 3 depicts a web page, including a list of fields of service from which service providers can be selected for live conversations in accordance with a further embodiment of the present invention;

FIG. 4 depicts a web page presented to a service provider desiring inclusion in a service provider database of the present invention in accordance with a further embodiment of the present invention;

FIG. 5 depicts a web page illustrating a user interface screen presented to a user desiring to select a service provider in accordance with an embodiment of the present invention;

FIG. 6 depicts a web page illustrating a user message screen presented to a user when the service provider system fails to establish a connection with a selected service provider in accordance with a further embodiment of the present invention;

DETAILED DESCRIPTION

The present invention overcomes the problems in the existing art described above by providing a method and apparatus for ensuring a real-time connection between users and selected service provider using voice mail. In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the steps of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

System Architecture

Figure 1:
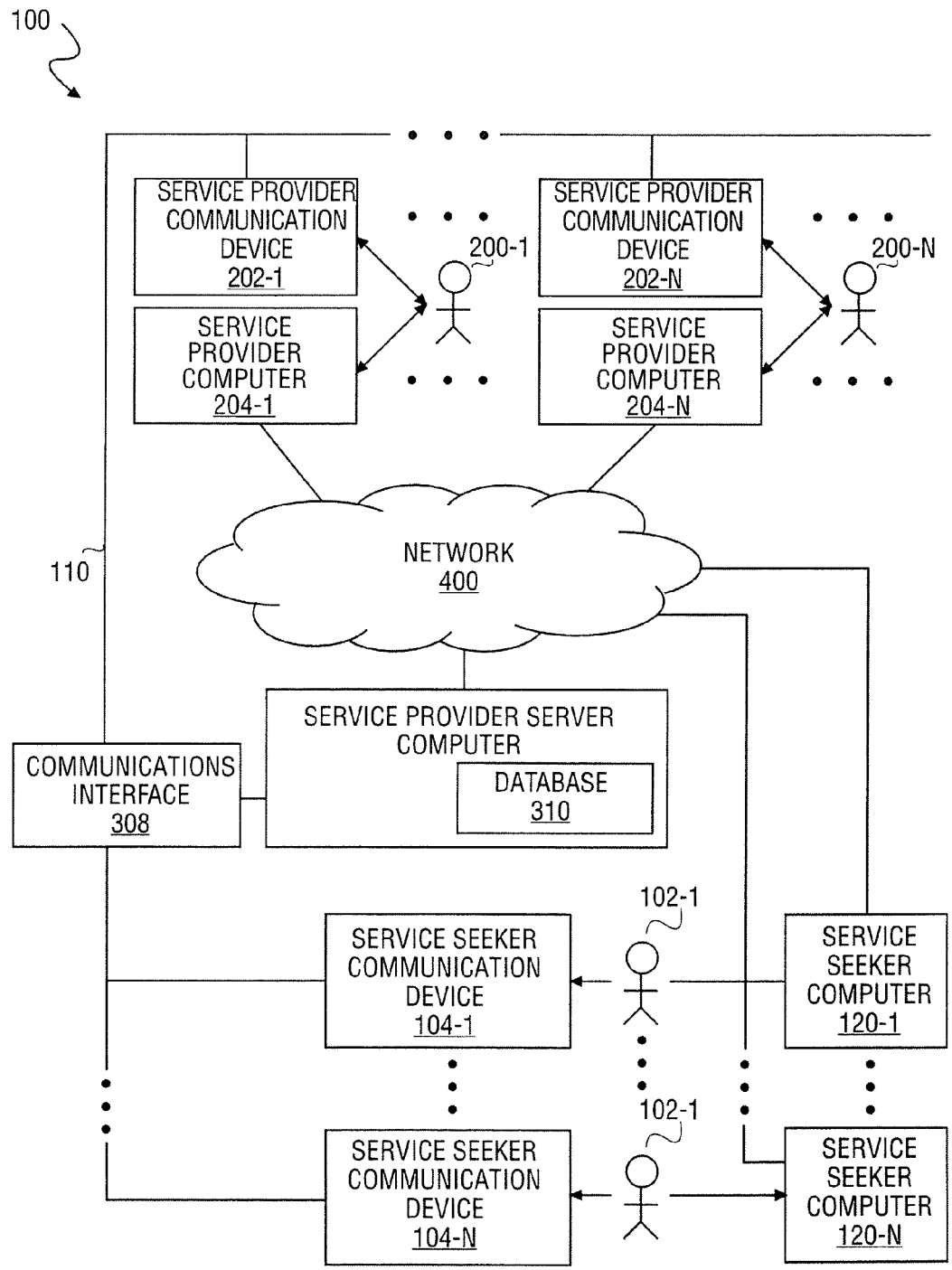
FIG. 1 depicts a block diagram illustrating a system in which a service provider system, in accordance with the present invention, may be implemented.

FIG. 1 depicts one embodiment of a service provider system architecture 100 in which the systems and methods of the present invention may be incorporated. The service provider system 100 includes one or more service seeker computers 120 (120-1, . . . , 120-N) connected through a network 400 (such as an Intranet, an Extranet, a LAN or a WAN such as the Internet) to a host computer or web server ("service provider server computer") 300. One or more service provider computers 204 are also connected to the service provider server computer 300 via the network 400. Persons skilled in the art will recognize that the service provider server computer 300 may include one or more computers working together to provide the controller computer functions described herein.

The system 100 also includes one or more service providers 200 (200-A, . . . , 200-N) each having a communications device 202 (202-1, . . . , 202-N) that is connected to a communications network 110. One or more service seekers (users) 104 (104-1, . . . , 104-N) are also included, each having a communications device 104 (104-A, . . . , 104-N) that is connected to the communications network 110. In accordance with the teachings of the present invention, a user 102 can send a request 106 (106-A, . . . , 106-N) via the communications device 104 or service seeker computer 120, which is received by the service provider server computer 300. As described in further detail below, the service provider server computer 300 can then automatically connect the user 104 to a selected service provider 200 for a live conversation either via the communication devices 102 and 202 or the computers 120 and 204.

The communications network 110 generally refers to any type of wire or wireless link enabling the transmission of voice data such as, but not limited to, a public switched telephone network, a wireless communications network, a local area network, a wide area network or a combination of networks. The communications devices 104 and 200 generally refer to any type of device capable of receiving speech from a user and providing the speech to a destination via a communications network, such as the communications network 110. In an embodiment of the present invention, the communications network 110 is a public switched telephone network and the communications device 104 and 200 are telephones.

Figure 2A:
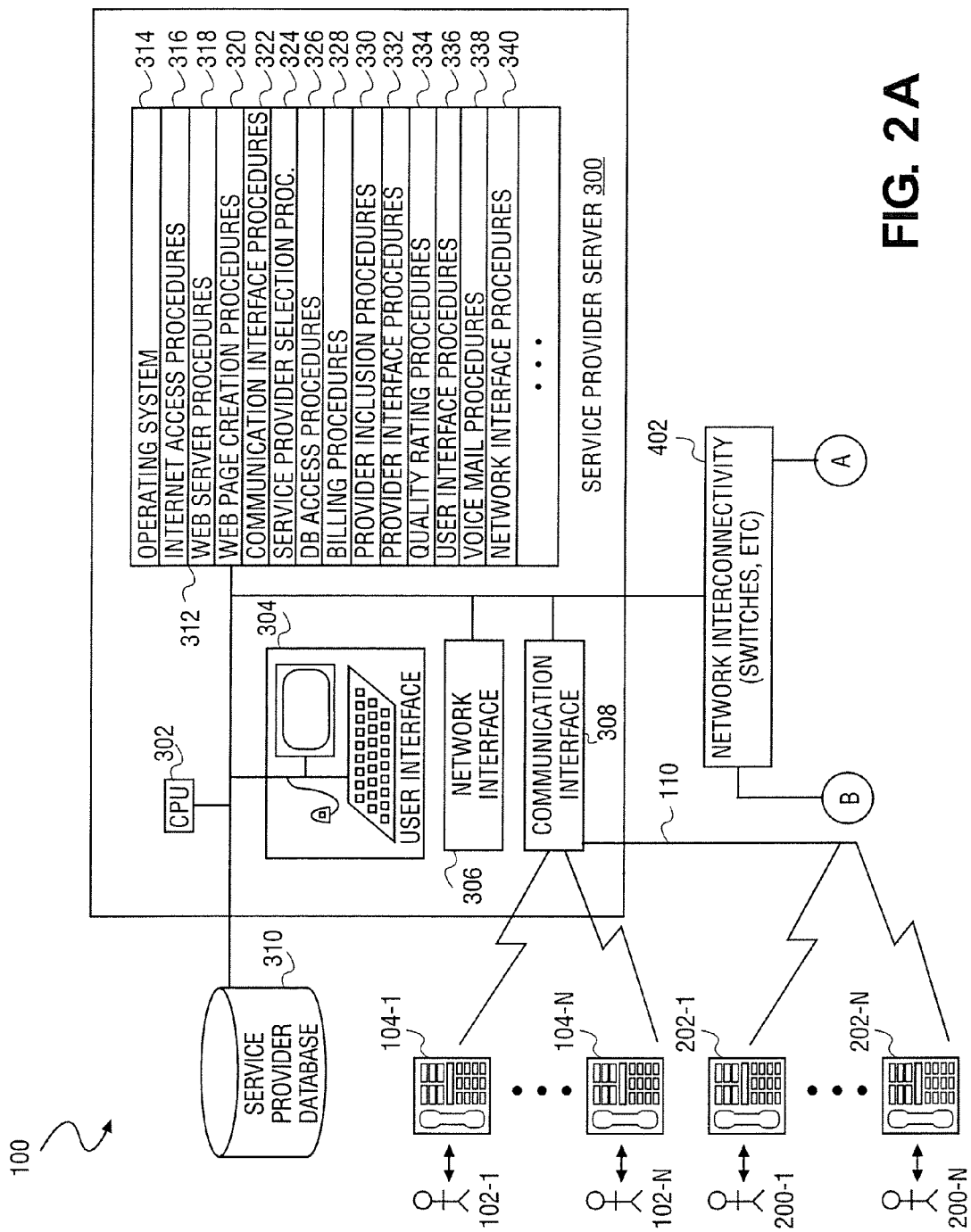
FIG. 2 is a block diagram further illustrating the service provider system as shown in FIG. 2.
Figure 2B:
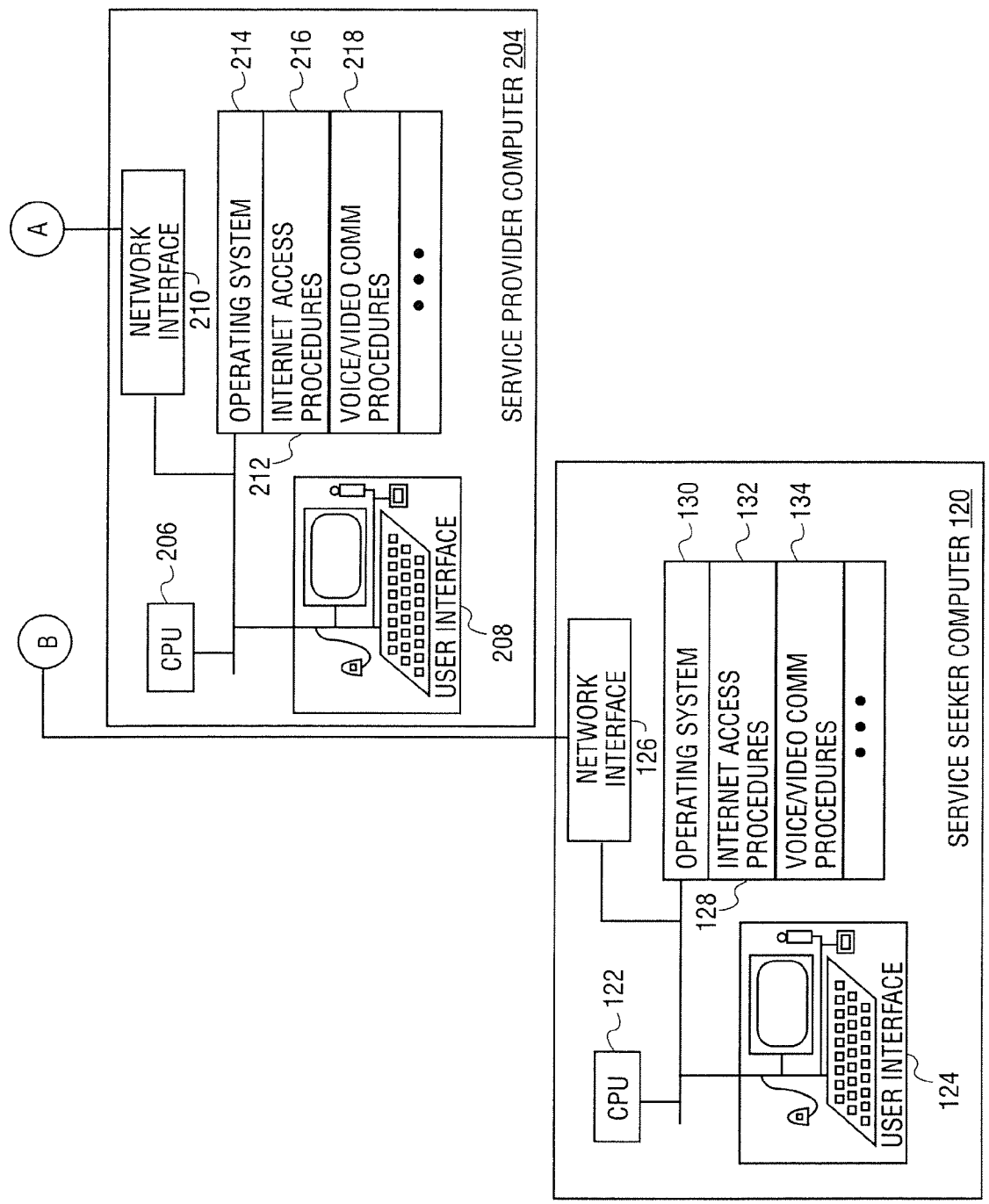

FIG. 2 further illustrates the service provider system 100, including the service provider server computer 300, the service seeker computer 120 and the service provider computer 204. The service provider server computer 300 includes a central processing unit (CPU) 302, a user interface 304, a communications interface 306, a voice interface 308, a service provider database 310 and a memory 312. The service provider server computer 300 can be any type of computing device, such as, but not limited to, desktop computers, work stations, lap tops and/or mainframe computers. The communications interface 308 is used to communicate with users 102 and service providers 200, as well as other system resources not shown. The communications interface 308 receives a voice request 106 provided by user 102 through a communications device 104, which is provided over the communications network 110. The communications interface 308 provides digitized voice requests to the service provider server computer 300 for interactive voice recognition, including voice processing, speech recognition and text-to-speech processing. The network interface 306 is used to connect a user computer 120 to a selected service provider computer 202 for real-time communication, such as voice over Internet Protocol (IP), video over-IP, or the like. The memory 312 of the voice portal server computer 300 may be implemented as RAM (random access memory) or a combination of RAM and non-volatile memory, such as one or more magnetic disk storage units. The memory can contain any of the following:

an operating system 314;

internet access procedures 316;

web server procedures 318;

web creation procedures 320;

communications interface procedures 322 for receiving the voice request 106 from the user 102 via the communications interface 308 and connecting the user 102 with a selected service provider 200 for a live conversation via the communications devices 104 and 202;

service provider selection procedures 324 for providing the user 102 with a list of fields of service providers provided by the service provider system 100, as well as lists of service providers matching a field of service selected by the user 102;

database (DB) access procedures 326 for querying the database 310 in order to return records of service providers matching a field of service selected by the user 102;

billing procedures 328 for billing the user 102 following a live conversation with the service provider 200, as well as compensating the service provider 200 for the live conversation and collecting a premium fee for the service provider system 100;

provider inclusion procedures 330 for providing an on-line interface to service providers 200 requesting inclusion in the service provider database 310 in order to provide live services via the service provider system 100 to perspective users 102;

provider interface procedures 332 for providing both an on-line interface, as well as a voice interface, allowing service providers 200 to update information in the service provider database 310, including times of availability;

quality rating procedures 334 for receiving a quality rating for a service provider 200 following a live conversation with a user 102 based on the user's evaluation of the services provided by the service provider 200;

user interface procedures 336 for providing the user 102 with an online interface as well as voice interface for providing listing of fields of service available from the service provider system 100, as well as receiving various descriptors for narrowing the search of service providers, including acceptable price ranges, acceptable quality ratings and specific languages;

conversation monitoring procedures 338 for measuring the duration of the live conversation between the user 102 and the service provider 200; and network interface procedures 340 for directing the network interface 306 is used to connect a user computer 120 to a selected service provider computer 202 for real-time communication, such as voice over Internet Protocol (IP), video over-IP, or the like;

other procedures and files.

FIG. 2 also illustrates the service seeker computer 120, which includes a CPU 122, a user interface 124, a memory 128 and a communications interface 126. The communications interface 126 is used to communicate with the service provider server computer 300, as well as other system resources not shown. Additionally, the service seeker computer may include a microphone as well as a digital video camera for enabling voice over-IP or video over-IP communication between a user 102 and a selected service provider 200. The memory 128 of the service seeker computer 120 may be implemented as RAM (random access memory) or a combination of RAM and non-volatile memory, such as one or more magnetic disk storage units. The memory 128 can contain the following:

an operating system 130;

internet access procedures 132;

voice/video communication procedures 134 for enabling voice over-IP or video over-IP communication between a user 102 and a selected service provider 200; and other procedures and files.

FIG. 2 also illustrates the service provider computer 202, which includes a CPU 204, a user interface 206, a memory 210 and a communications interface 208. The communications interface 208 is used to communicate with the voice portal server computer 300, as well as other system resources not shown. Additionally, the service provider may include a microphone as well as a digital video camera for enabling voice over-IP or video over-IP communication between a user 102 and a selected service provider 200. The memory 210 of the service provider computer 202 may be implemented as RAM (random access memory) or a combination of RAM and non-volatile memory, such as one or more magnetic disk storage units. The memory 210 can contain the following:

an operating system 212;

internet access procedures 214;

voice/video communication procedures 216 for enabling voice over-IP or video over-IP communication between a user 102 and a selected service provider 200; and as well as other procedures and files.

Figure 4:
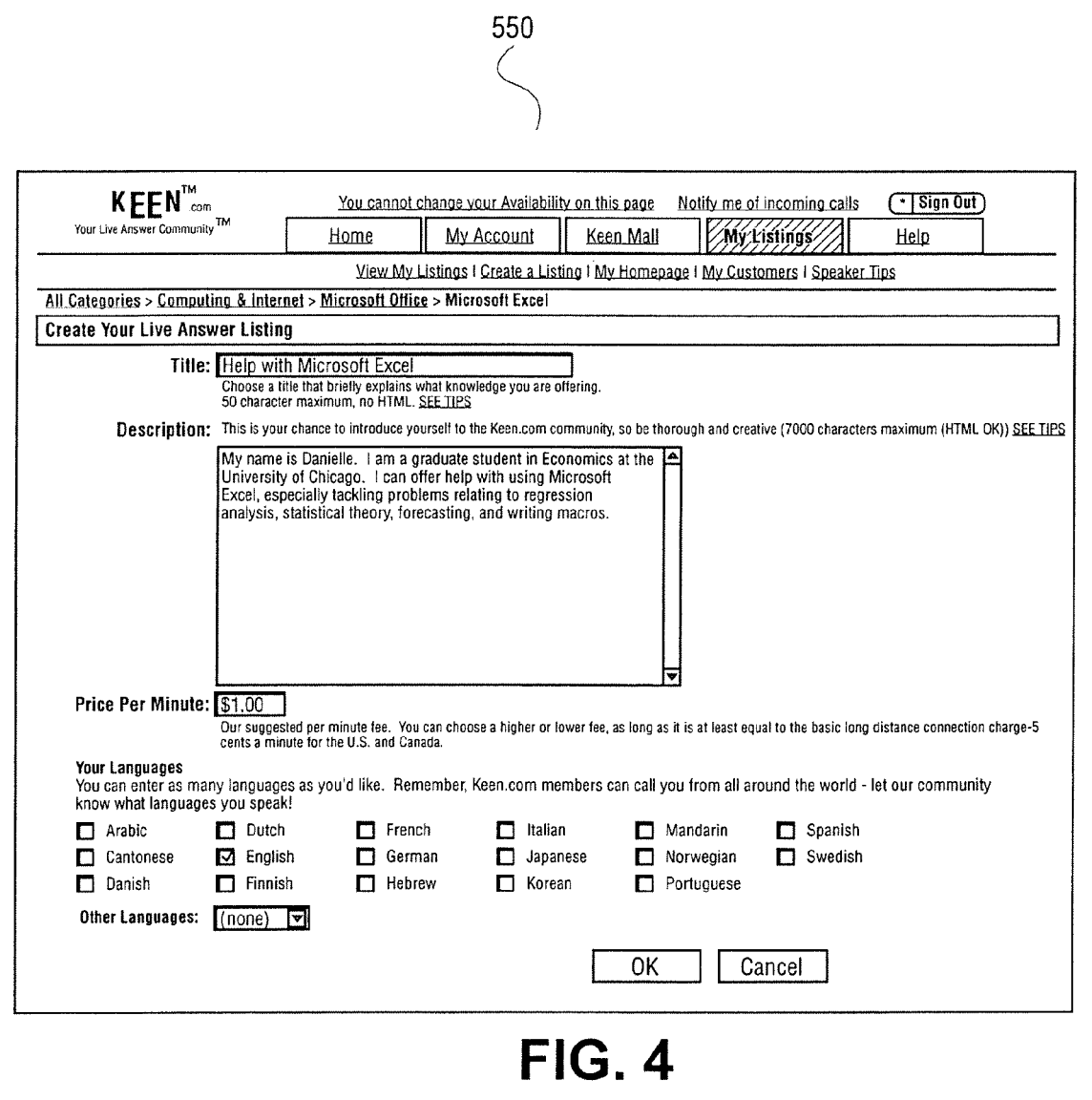

The embodiment depicted in FIG. 2 includes a service provider database 310 containing information about a wide array of service providers 200. In order to present themselves to their potential clients, service providers 200 list themselves in this database 310. In one embodiment, this is done through the use of an Internet web site, via web pages 500 and 550, as depicted in FIGS. 3 and 4. The service provider 200 registers his/her name and phone number using the web page 550, along with a description of the service that he/she offers. Possible examples of the wide array of fields of service available from the service provider system 100 include, but are not limited to, the fields of service depicted in FIG. 3. The description includes key words describing the field of service. The description also includes a price for rendering the service, most commonly, but not restricted to a per-minute price.

The service provider 200 then informs the service provider system 100 of the times when he/she is available to receive calls. This can be done by creating a schedule of suitable times at the web site 500 or by simply clicking on an "on call"/"off call" switch at the web site 500. Switching service provider 200 availability status can also be done through a voice transmission medium such as a telephone. The service provider 200 calls the central phone number, identifies himself/herself with a password, then presses the telephone keypad "1" or "2", for example, to indicate "on call" or "off call" status, respectively. Once the database 310 contains the phone numbers of service providers, email address, network address, descriptions of their services, their prices, and their real-time availability status, the service provider system 100 can provide services to users 102 desiring corresponding services.

In one embodiment a telephone is used as part of the delivery mechanism or communications device 104 and 202 of the service provider system 100. A user 102 seeking services dials a central telephone number and then listens to a series of options. The seeker indicates which type of service he would like to receive by speaking the name of a profession, such as "psychiatrist," which is processed by the system's voice interface 308 using voice interface procedures 322. Alternatively, the user 102 can listens to a series of professions and press the numerical keypad to select one. This process continues until the desired field of service is selected.

Once the user 102 has indicated a field of service using the service provider selection procedures 324, the service provider system 100 searches its database 310 for service providers in that field using the DB access procedures 326. The user 102 can then further narrow down the selection of service providers by speaking keywords, such as "psychiatry—depression." The user 102 can also indicate a known specific service provider by speaking the service provider's name or punching in the service provider's code number into a telephone keypad.

The service provider selection procedures 324 in conjunction with the user interface procedures 338 allow the user 102 to further narrow the search for a service provider 200 by speaking—or pressing into the telephone keypad—a price, such as "50 cents per minute." The service provider server computer 300 will then narrow the search in the database 310 for service providers 200 that match the price range. The user 102 can further narrow the search for a service provider 200 by speaking—or pressing into the telephone keypad—a quality rating, such as "three stars or higher." The server computer 300 will then narrow the search in the database 340 for service providers 200 which match the quality rating range. Finally, the user 102 can further narrow the search for a service provider by speaking—or pressing into the telephone keypad—the name of a language, such as "Spanish." The server computer 300 will then narrow the search in the database 310 for service providers 200 who can speak this language.

Alternatively, a user 102 may select a service provider using the user interface screen 600 as depicted in FIG. 5. Once the user 102 has established a connection with the service provider system 100, the user can query the various fields of service provided by the service provider system 100. Generally, the user 102 will make a selection based on the criteria described above for performing voice recognition of a voice request received from the user 102.

Once a service provider 200 with the desired characteristics has been chosen, the service provider system 100 will automatically connect the user 102 with the selected service provider 200. Since the service provider 200 has informed the service provider system 100 that he/she is "on call" and ready to receive calls, the service provider system 100 can reach him/her with a simple phone call via the communications interface 308. Once both the user 102 and provider 200 are on the phone line 110, the service provider system 100 conferences the two phone calls together, enabling services to be rendered in a live conversation. The system keeps track of the time spent on the phone call using the conversation monitoring procedures 340. The user 102 is then billed accordingly, and the funds are transferred to the provider 200 using the billing procedures 328.

Unfortunately, the system cannot always establish a real-time communications connection between the user 102 and the selected service provider 200. Generally, the system will attempt to contact the selected service provider via the service provider communications device 202. The system will attempt to contact the selected service provider 200 a predetermined number of times, which is, for example, two attempts. In the event that the system fails to establish a connection with the selected service provider 200, the user is presented with the user message screen 630, as depicted with reference to FIG. 6.

Using the user message screen 630, the user can record a message for the selected service provider 200. Once the message is completed, the system 100 transmits and notifies the selected service provider 200 of the voice mail message. When the selected service provider reviews the voice mail message, the selected service provider 200 has the option of establishing a connection with the user 102 at such time. If the service provider 200 establishes a connection with the user, the service provider will be compensated an amount that is generally deducted from a service provider when they are unavailable at an indicated time of availability.

At the end of the phone call, the system prompts the user 102 to rate the quality of the received service using the quality rating procedures 338. A quality rating of one to five stars, for instance, can be spoken into the telephone 104 or pressed into the telephone keypad. The service provider system 100 records this rating, and in turn, can store the quality rating in the database 310 and use it as a quality-selection criterion the next time a user 102 calls. Procedural methods for implementing the teachings of the present invention are now described.

Operation

Figure 8:
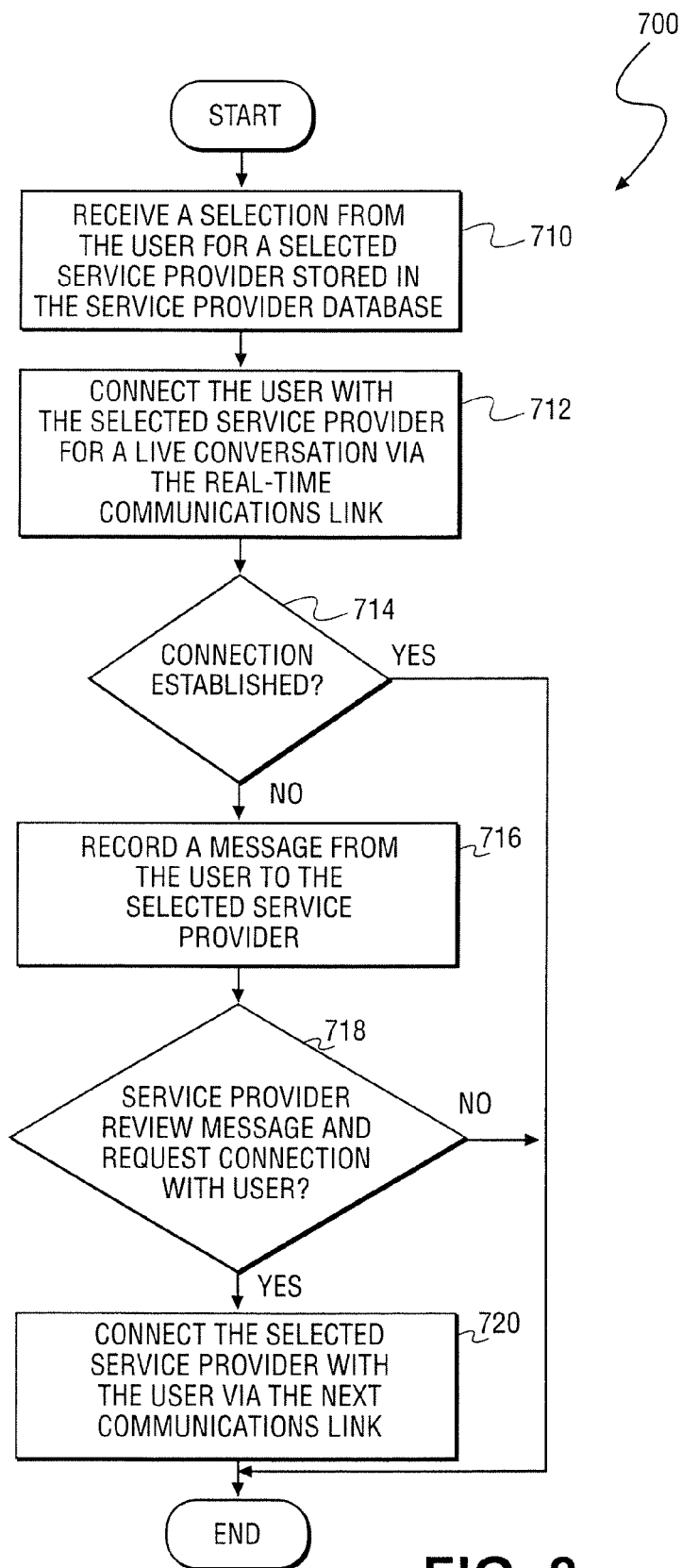
FIG. 8 depicts a flow chart illustrating a method for ensuring a connection between a user and a selected service provider in accordance with an embodiment of the present invention.

Referring now to FIG. 8, a method 700 is depicted for ensuring that a user 102 request 106 to a service provider system 100 results in a live conversation between a user 102 and a selected service provider 200, for example, in the service provider system 100 as depicted in FIGS. 1 and 2. At step 710, the service provider server computer 300 receives a selection from the user for a selected service provider 200 stored within the service provider database 310. At step 712, the service provider server computer 300 uses, for example, the voice interface 308 to connect the user 102 with the selected service provider 200 for a live conversation via the voice transmission mediums 104 and 202. The communication interface procedures 322 handle receipt of the request 106 and connection of the user 102 with the selected service provider 200. However, the voice interface procedures 322 may be performed by a human operator. Alternatively, the user may select a service provider 200 via the user interface screen 600, as depicted in FIG. 5, using the network interface 306 and network interface procedures 340.

The establishment of the real-time communications connection between the user 102 and the selected service provider 200, as described in step 712, is generally automatically performed by the system 100. In one embodiment, when the user establishes an internet connection between the user computer 120 and the service provider server 300, via network interface 306, the user 102 may be given the option as to the method for establishing a connection with the selected service provider 200. As such, the service provider server 300 may connect the user telephonically via communications devices 104 and 202. Alternatively, the user may request a network connection with the selected service provider via user computer 120 and selected service provider computer 204, using the network interface procedures 340.

In one embodiment, when the user 102 selects a telephonic connection with the selected service provider 200, the service provider server computer 300 will place a telephone call to the user 102 via a connection separate from the internet connection between the user 102 and the service provider server computer 300. In addition, the server computer 300 will place a telephone call to the selected service provider 200. Once a telephone call between the server computer 300 and the selected service provider 200 is established, the server computer 300 will interface both calls via communications interface 308, such that the user 102 and the selected service provider 200 may telephonically communicate via communications devices 104 and 202. Alternatively, if the user 102 has established a telephonic connection with the server computer 300, via the communications device 104, the server computer 300 will generally connect the user with the selected service provider via communications devices 104 and 202, thereby enabling telephonic communication between the user 102 and the selected service provider 200.

At step 714, the system 100 determines whether a successful connection was established between the user 102 and the selected service provider 200. When the system 100 fails to establish a successful connection, step 716 is performed. At step 716, the system allows the user 102 to record a message for the selected service provider. At step 718, it is determined whether the service provider 200 has reviewed the voice mail message. Once the service provider 200 reviews the voice mail message, via for example, the voice mail review screen 660 as depicted in FIG. 7, the service provider 200 has the option to establish a connection with the user 102 at such time.

Figure 7:
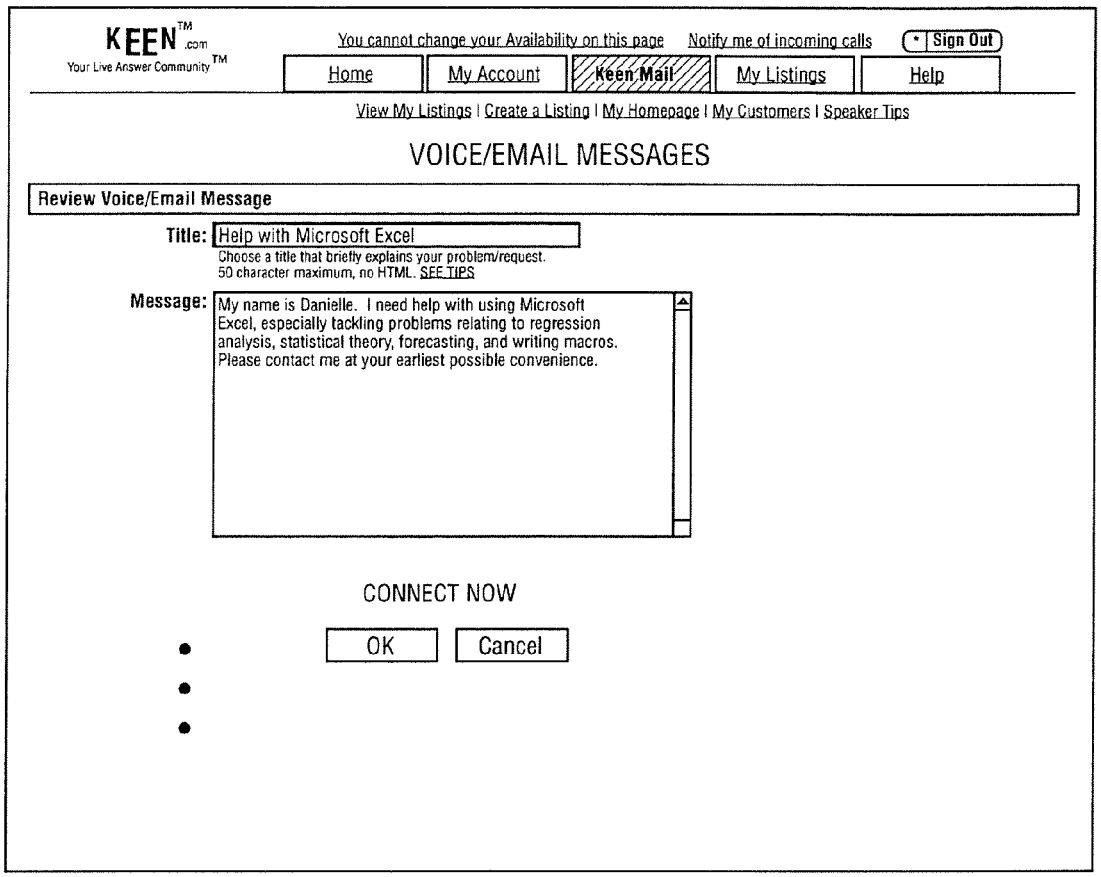
FIG. 7 depicts a web page illustrating a service provider voice mail review screen presented to a service provider after missing an attempted connection with a user in accordance with a further embodiment of the present invention.

At step 720, the system 100 automatically connects the selected service provider 200 with the user 102 via a real-time communications link, for example, the communications devices 104 and 202 when the user clicks the "OK" button (FIG. 7). The failure of the system 100 to establish a real-time communications link between the user 102 and a selected service provider 200 will result in a deduction of a predetermined amount from the selected service provider 200. The system will generally telephonically contact the user 102 and the service provider 200 via communications devices 104 and 202. Alternatively, the user 102 and selected service provider may be connected with and directly communicate via their computer 120 and 204 using video over-IP or voice over-IP with the network interface procedures 340.

Figure 9:
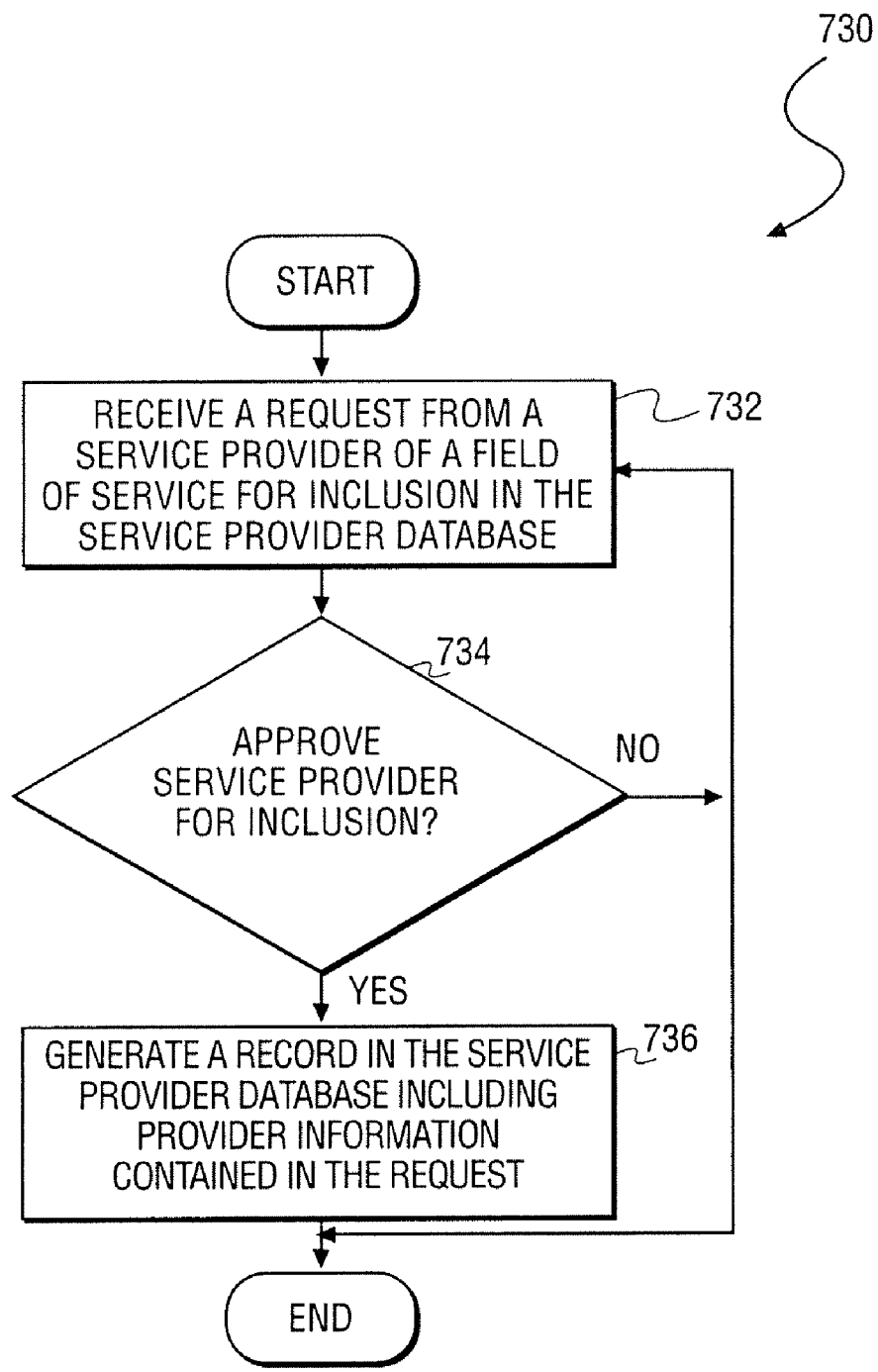
FIG. 9 depicts a flow chart illustrating a method used by a service provider desiring inclusion in the service provider database in accordance with a further embodiment of the present invention.

FIG. 9 depicts additional method steps 730 for adding service providers 200 to the service provider system 100. At step 732, the server computer 300 receives a request from a service provider 200 of a field of service requesting inclusion in the service provider database 310. At step 734, the service provider system 100 determines whether to approve the service provider 200. Approval of a service provider 200 includes, for example, adding an additional field of service to the service provider system 100 for a new service provider 200. At step 736, when the service provider 200 is approved, the server computer 300 generates a record in the service provider database 310, including provider information contained in the voice request 106. Acceptance of the provider 200 and generation of provider records in the service provider database 310 is performed by the server computer 300 using provider inclusion procedures 330. The provider information stored in the database 310 can include a service price, real-time service provider availability, specific expertise of the service provider, telephone number, network address, e-mail address, languages spoken by the provider and a quality rating for the service provider.

Figure 10:
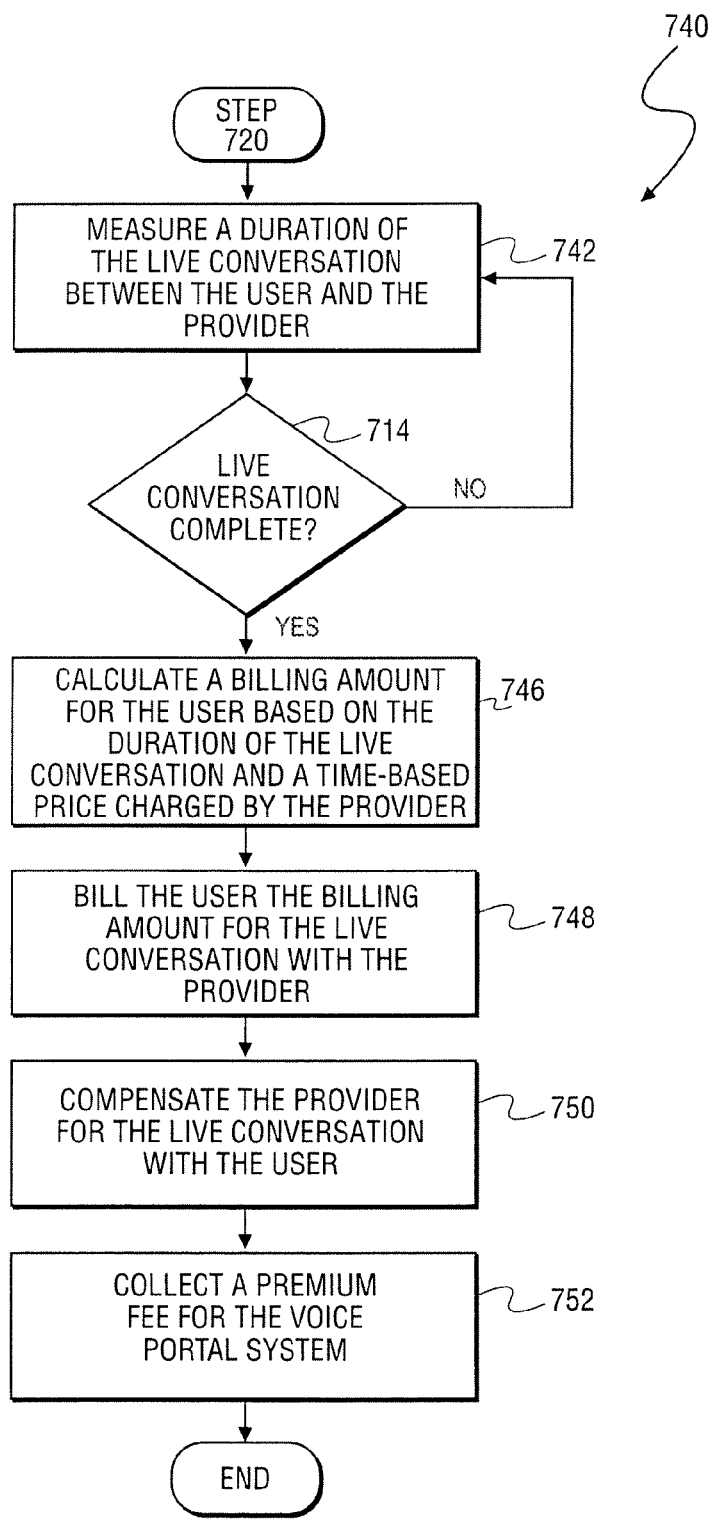
FIG. 10 depicts a flow chart illustrating a method for billing a user and compensating a service provider following a live conversation in accordance with a further embodiment of the present invention.

FIG. 10 depicts additional method step 740 for billing a user 102 and compensating a service provider 200 for a live conversation between the provider 200 and the user 102. At step 742, the server computer 300 measures a duration of the live conversation between the user 102 and the provider 200 using the conversation monitoring procedures 340. Once the live conversation is complete, the server computer 300 calculates a billing amount for the user 102 based on the duration of the live conversation and a time-based price charged by the service provider 200. The billing amount is generated by the server computer 300 using the billing procedures 328. However, the billing amount may be a flat fee. Otherwise, the server computer 300 continues measuring the duration of the live conversation between the user 102 and service provider 200 at step 742. The time-based price charged by the service provider 200 includes, for example, a per minute price, hourly price or a flat fee.

At step 748, the server computer 300 bills the user 102 the billing amount for the live conversation with the provider 200. Generally, users 102 of the service provider system 100 will have a billing account set up with the system 100. The service provider system 100 can then either deduct from the user's account or charge the billing amount, for example, to a credit card submitted by the user 102. At step 750, the voice portal service provider system 100 compensates the provider 200 for the live conversation with the user 102. Finally, at step 752, the server computer 300 collects a premium fee for the service provider system 100 as a predetermined percentage of the billing amount, for example, ten percent.

Figure 11:
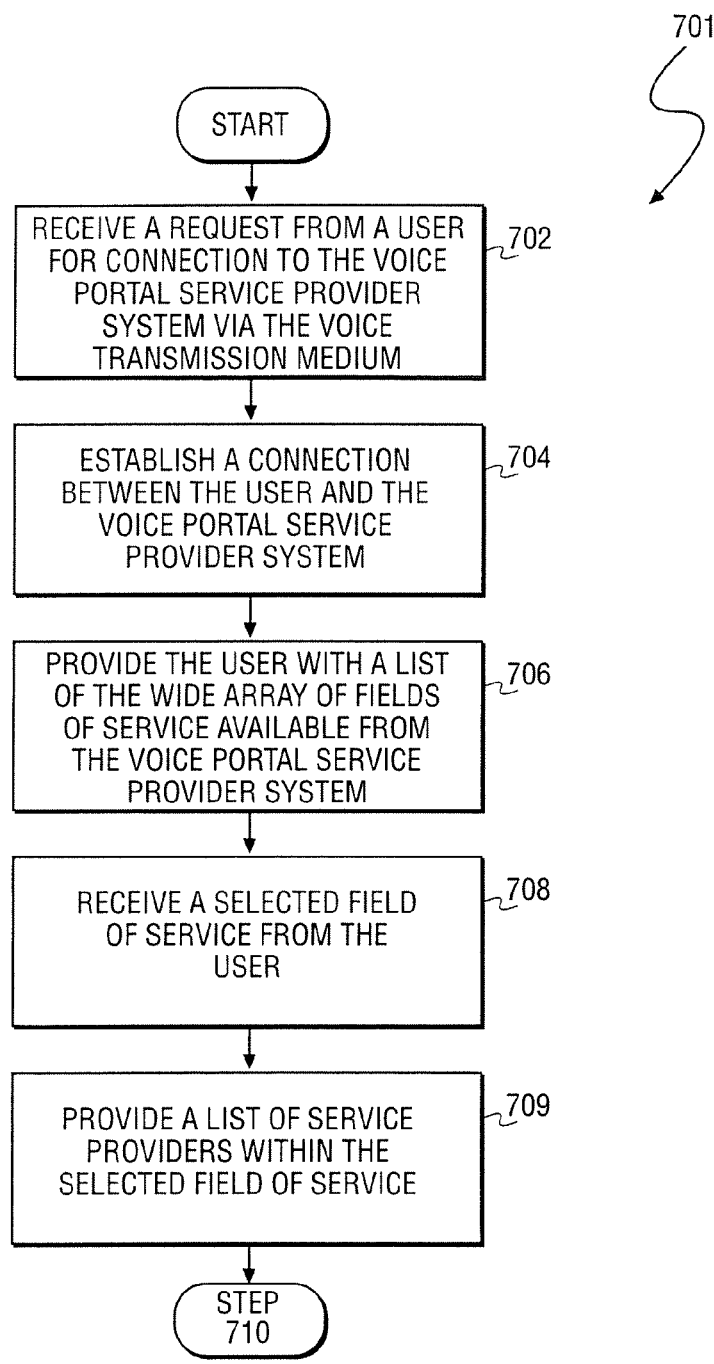
FIG. 11 depicts a flow chart illustrating a method for connecting a user desiring a service provider to the service provider system in accordance with a further embodiment of the present invention.

FIG. 11 depicts additional method step 701 for connecting a user 102 to the service provider system 100. At step 702, the server computer 300 receives a request from a user 102 for connection to the service provider system 100 via, for example, the communications device 104. The communications device 104 is, for example, a telephone. At step 704, the server computer 300 establishes a connection between the user and the system 100 via the communications interface 308. At step 706, the server computer 300 provides the user 102 with a list of the wide array of fields of service available from the service provider system 100 using the user interface procedures 338.

At step 708, the server computer 300 receives a selected field of service from the user 102. Finally, at step 709, the server computer 300 provides a list of service providers within the selected field of service provided by the user. The list generally indicates whether each individual service provider is currently available to telephonically communicate with the user at the time when the user is viewing the list. The list generally further indicates individually whether a service provider is currently on a telephone call with another user when the user is viewing the list. The list also includes a compensation rate for each listed service provider.

Figure 12:
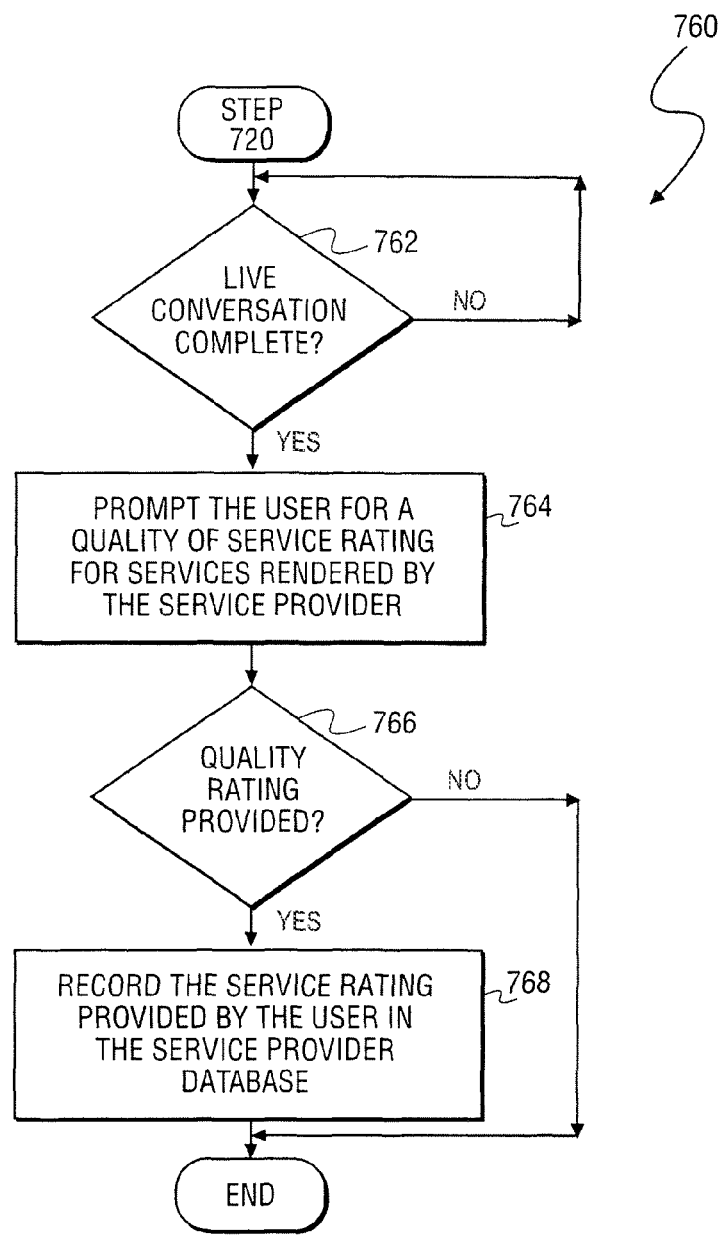
FIG. 12 depicts an additional method for receiving a quality rating from a user regarding services provided by a service provider in accordance with a further embodiment of the present invention.

FIG. 12 depicts additional method step 760 for receiving a quality rating from a user 102 regarding the live conversation with the service provider 200. At step 762, it is determined whether the live conversation is complete. At step 664, the server computer 300 prompts the user 102 for a quality of service rating for services rendered by the service provider 200. At step 766, it is determined whether a quality rating is provided by the user 102. At step 768, the server computer 300 records the service rating provided by the user 102 in the service provider database 310. As described above, the request 106 provided by the user 102 can include the category of service providers, a maximum price range for service providers, desired times of availability for service providers, specific expertise of the service provider, a language spoken by the service provider and a minimum quality rating for the service provider. These criteria are used by the server computer 300 and provided to service provider selection procedures 324 in order to narrow the list of service providers 200 for the user 102 to choose from.

Figure 6:
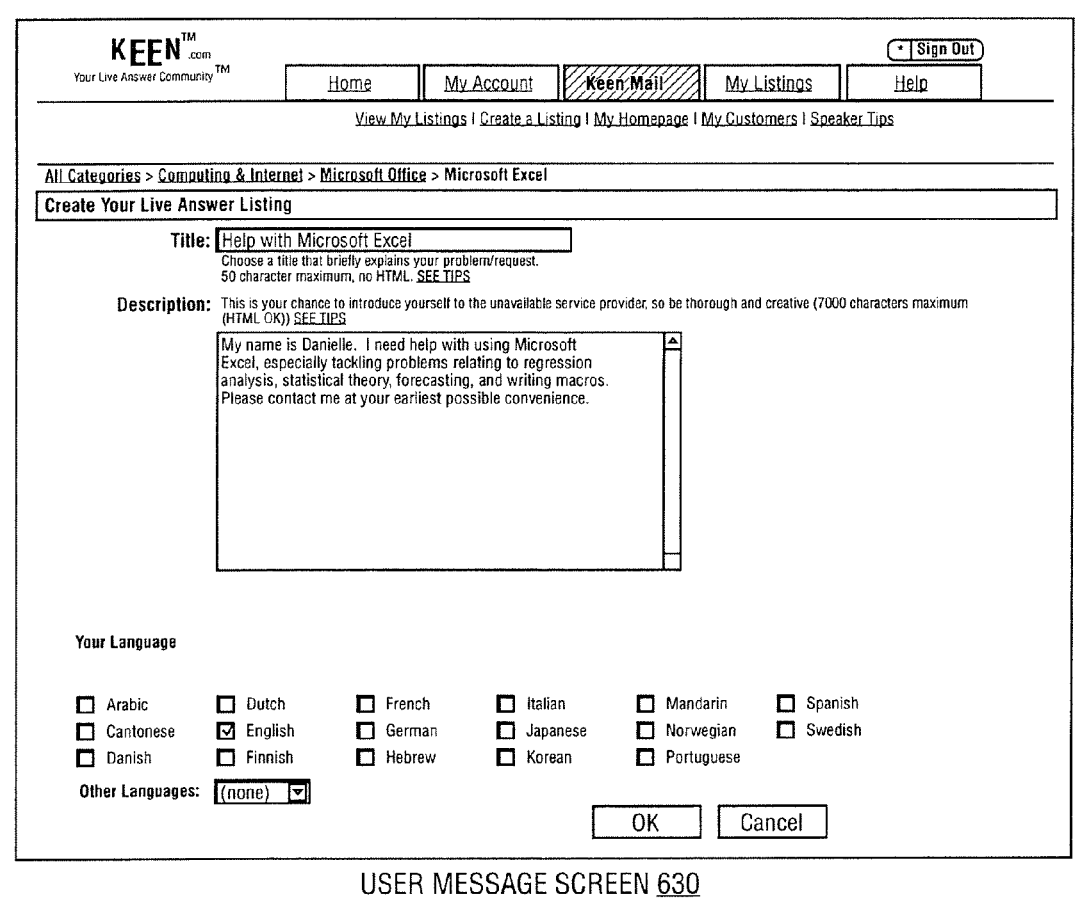
Figure 13:
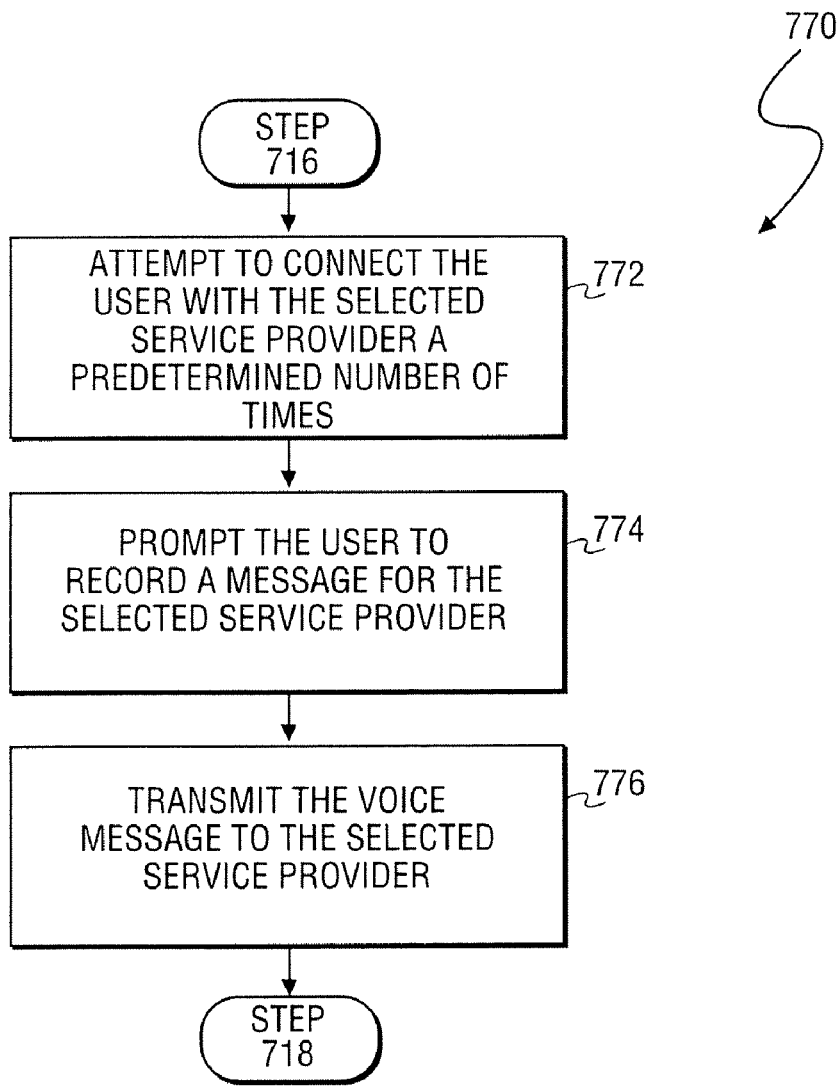
FIG. 13 depicts an additional method for ensuring the establishment of a real-time communications link for providing a live conversation between a user and a selected service provider in accordance with a further embodiment of the present invention.

Referring now to FIG. 13, FIG. 13 depicts additional method steps 770 for ensuring the establishment of a real-time communications connection between the user 102 and the selected service provider 200 in order to guarantee a live conversation therebetween. At step 772, the system 100 attempts to connect the user with the selected service provider a predetermined number of times. Generally, the system 100 will repeat the connection attempt two times before acknowledging the failure of the connection between the user 102 and the selected service provider. At step 774, the system 100 prompts the user 102 to record a message for the selected service provider, for example, using the user message screen 630 as depicted in FIG. 6. When the user has completed the voice message at step 776, the system 100 transmits the voice message to the selected service provider.

Application of the Invention

Danielle, a graduate student in economics, happens to be an expert user of Microsoft Excel. To earn extra money while writing her thesis, Danielle decides to post her Excel-help service son the subject web site, an Internet based implementation of the invention. She registers at the site and lists herself under "Computer Help" and "Excel" at the rate of $1.00 per minute. During the registration process, Danielle provides her telephone number and a description of her abilities, which include regression models and statistical analysis. Whenever Danielle is at home alone studying for long stretches in the evening, she signs on to the subject web site and changes her state of availability to "On Call," or immediately available to receive clients.

Michael is a management consultant building a regression model on Excel for a large clothing retailer. At midnight in the office, he is having trouble analyzing his spreadsheet. Looking to receive help, he dials the 1-800 number of the subject system. He is prompted by the system to indicate the area of service he desires. He speaks the words, "Computer Help," which are recognized by the system's voice-recognition software. The system has several thousand computer-help service providers to choose from, so Michael specifies his needs by speaking the words, "regression models and analysis." The system has about 50 service providers who are "On Call" to receive customers regarding regression models and analysis. Michael then indicates the price and quality he desires by speaking the words, "one dollar per minute or less" and "with a three-star quality rating or above." The system uses these parameters to fine only those service providers who fit within this price and quality range and can presently receive customers regarding regression models and analysis—there are four. The system relays the descriptions of the four service providers to Michael. He selects Danielle by speaking the words, "Connect Me."

Since Michael has not used the subject phone system before, he first must enter his credit card number to pay for the call. Once the credit card number has been confirmed, the system dials Danielle's phone number, which it has on file from her registration at the web site. When Danielle picks up the phone, the automated voice of the system informs her that there is a client on the line looking for "Computer Help" and willing to pay her $1.00 price per minute. The system asks her whether she would like to accept the call. She speaks the word "yes" (or presses "1" on her telephone keypad), and the system conferences the separate phone calls to Danielle and Michael together so that they can communicate.

However, for the reasons described above, the system cannot always establish a real-time communications connection between Michael and Danielle. Generally, the failure of the system to establish a connection between Michael and Danielle results from the unavailability of Danielle during an unindicated time of unavailability. If the system fails to establish a connection between Michael and Danielle, Michael will be presented with a user interface screen and prompted to leave a message for Danielle. Once Michael has left the message for Danielle, the voice mail message will be transmitted to Danielle. Once Danielle receives the message, Danielle is presented with the option of re-establishing a real-time communications connection with Michael via a service provider voice mail review screen. In response to such a request from Danielle, the system will connect Michael and Danielle so that they may proceed with the live conversation and resolve Michael's technical difficulty.

Michael and Danielle talk until his problem is solved, which takes eight minutes. Michael's credit card is billed for eight dollars. He receives a confirming message via electronic mail notifying him of this, along with a request to evaluate Danielle's service, which he does, pressing "5" on his telephone keypad to award her five stars, which the system then averages into her overall quality rating. Danielle's web site account is credited for eight dollars minus a fee collected by the web site. Once Danielle's web site account has accumulated a surplus of $25, she receives a check from the web site in the mail. After receiving many positive reviews from online clients such as Michael, Danielle is inundated with Excel-help requests whenever she goes "On Call," enabling her to raise her rates to $1.50 per minute.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known components and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

Although the present invention has been described with reference to a service provider system, it is not limited to providing services over the telephone or between computers. The present invention can be used for other electronic commerce purposes, other commodities, other types of provider, and other types of services not explicitly listed. In addition, communications mediums within the contemplation of the present invention include systems for wireless communications or any network capable of transmitting voice data or video data for providing a live conversation over the computer. Moreover, performance, by a human operator, of the interactive voice recognition procedures of the present invention is within the contemplation of the present invention.

Advantages of the invention include providing users with the capability to engage in a live conversation with a selected service provider via a telephone. Contrary to prior systems, requiring an internet connection and browser to receive such services, the equivalent is now provided by a simple voice transmission medium such as the telephone. As a result, virtually anyone can benefit from the capabilities provided by the present invention. The system also allows providers of a field of service to be compensated for supplying their expertise to a user. In addition, the system ensures a real-time communications connection between a service seeker and a selected service provider once the service provider becomes available following an initial unavailability.

Having disclosed exemplary embodiments and the best mode, modifications and variations may be made to the disclosed embodiments while remaining within the scope of the invention as defined by the following claims.

What is claimed is:

1. A method, comprising:
    presenting to a user over a voice transmission network a verbal list of service providers available to provide voice communications in real time, the verbal list indicating that each service provider presented in the verbal list is currently available to provide voice communications in real time with the user via a live voice transmission connection;
    responsive to the user selecting a service provider from the verbal list, initiating a first connection attempt by the voice transmission network system for real time voice communications between the user and the service provider;
    in response to a failure to establish real time voice communications between the user and the service provider through the first connection attempt due to unavailability of the service provider, enabling the user to record a voice message on the voice transmission network system, for the service provider; and
    responsive to the service provider reviewing the voice message recorded on the voice transmission network system, connecting the service provider to initiate a second connection attempt for real time voice communications between the service provider and the user, wherein the voice transmission network system does not disclose contact information of the user to the service provider.

2. The method of claim 1, further comprising:
    collecting a premium fee for a connection between the user and the service provider established through the second connection attempt.

3. The method of claim 2, wherein the premium fee is based on a duration of real time communications through the second connection attempt and a price specified by the service provider.

4. The method of claim 1, wherein the second connection attempt comprises an attempt for a telephonic connection between the user and the service provider.

5. The method of claim 1, further comprising:
    presenting the voice message to the service provider with an option to call back the user for the second connection attempt;
    wherein the second connection attempt is initiated in response to the service provider selecting the option.

6. The method of claim 1, further comprising:
    notifying the service provider of the voice message via a web based interface.

7. The method of claim 1, further comprising:
    establishing a telephonic connection between the user and the voice transmission network system;
    wherein the verbal list of service providers is provided over the telephonic connection between the user and the voice transmission network system.

8. The method of claim 7, further comprising:
    receiving a user selection of a field of service over the telephonic connection between the user and the voice transmission network system; and
    selecting the verbal list of service providers based on the user selection of the field of service and based on inputs received from the service providers, the inputs indicating real time availability of the service providers for telephonic communications.

9. The method of claim 1, wherein the failure comprises failing by the voice transmission network system to get through to the service provider after a predetermined number of attempts.

10. A tangible machine readable storage medium, storing instructions, which instructions, when executed by a voice transmission system computing device, cause the voice transmission system computing device to execute a method, the method comprising:
    presenting to a user through the voice transmission network a verbal list of service providers available to provide voice communications in real time, the verbal list indicating that each service provider presented in the verbal list is currently available to provide voice communications in real time with the user via a live voice transmission connection;
    responsive to the user selecting a service provider from the verbal list, initiating a first connection attempt by the voice transmission network system for real time voice communications between the user and the service provider;
    in response to a failure to establish real time communications between the user and the service provider through the first connection attempt, allowing the user to record a voice message on the voice transmission system;
    presenting the voice message to the service provider with an option to connect the service provider to the user;
    establishing real time voice communications between the user and the service provider through a second connection attempt over the voice transmission system in response to a selection of the option, wherein the voice transmission system does not disclose contact information of the user to the service provider;
    billing the user for a connection established through the second connection attempt; and
    compensating the service provider for service provided by the service provider during a second connection.

11. The storage medium of claim 10, wherein billing the user and compensating the verbal service provider are according to a price specified by the service provider.

12. The storage medium of claim 11, wherein billing the user and compensating the verbal service provider are further according to a duration of real time communications through the second connection.

13. The storage medium of claim 10, wherein billing the user and compensating the service provider are for a service rendered by the service provider through the second connection.

14. The storage medium of claim 10, wherein the second connection comprises a telephonic connection.

15. A communication system, comprising:
    a first unit of a voice transmission system configured to present to a user a verbal list of service providers available to provide voice communications in real time, the verbal list indicating that each service provider presented in the verbal list is currently available to provide voice communications in real time with the user;
    a second unit of the voice transmission system configured to initiate a first connection attempt for real time communications between the user and a service provider, responsive to the user selecting the service provider from the verbal list; and a third unit of the voice transmission system configured to record a voice message from the user for the service provider, in response to a failure to establish real time communications between the user and the service provider through the first connection attempt due to unavailability of the service provider, the second unit configured to initiate a second connection attempt for real time communications between the service provider and the user, in response to the service provider reviewing the voice message, wherein contact information of the user is not disclosed to the service provider.

16. The system of claim 15, further comprising:
a fourth unit of the voice transmission system configured to notify the service provider of the voice message via a web based interface.

17. The system of claim 15, wherein the list of service providers is provided over a telephonic connection between the user and the voice transmission system.

18. The system of claim 15, wherein the failure comprises failing by the voice transmission system to get through to the service provider after a predetermined number of attempts.

* * * * *